United States Patent
Yokoyama et al.

(10) Patent No.: US 9,142,158 B2
(45) Date of Patent: Sep. 22, 2015

(54) CONTROL OF VIDEO SIGNAL POWER VARIATIONS IN SELF LIGHT EMITTING DISPLAY DEVICE

(71) Applicant: Sony Corporation, Tokyo (JP)

(72) Inventors: Yuki Yokoyama, Tokyo (JP); Yasuo Inoue, Tokyo (JP); Shinichi Takizawa, Tokyo (JP)

(73) Assignee: JOLED INC., Tokyo (JP)

( * ) Notice: Subject to any disclaimer, the term of this patent is extended or adjusted under 35 U.S.C. 154(b) by 97 days.

(21) Appl. No.: 14/101,518

(22) Filed: Dec. 10, 2013

(65) Prior Publication Data

US 2014/0176619 A1    Jun. 26, 2014

(30) Foreign Application Priority Data

Dec. 21, 2012 (JP) .................. 2012-279834

(51) Int. Cl.
*G09G 3/32* (2006.01)
*G06F 1/32* (2006.01)

(52) U.S. Cl.
CPC ............ *G09G 3/3208* (2013.01); *G06F 1/3265* (2013.01)

(58) Field of Classification Search
CPC .............. G09G 3/2081; G09G 3/3208; G09G 2340/16; G09G 2330/021; G09G 2320/064; G09G 2320/0252; G09G 3/2077; G09G 3/2803; G06F 1/3203; G06F 1/3265
USPC ........................................................ 345/690
See application file for complete search history.

(56) References Cited

U.S. PATENT DOCUMENTS

| | | | |
|---|---|---|---|
| 2008/0225062 A1* | 9/2008 | Chang et al. ................ | 345/691 |
| 2011/0227966 A1* | 9/2011 | Mori ........................... | 345/690 |
| 2011/0273489 A1* | 11/2011 | Inoue ........................... | 345/690 |

FOREIGN PATENT DOCUMENTS

JP    2007-147868    6/2007

* cited by examiner

*Primary Examiner* — Larry Sternbane
(74) *Attorney, Agent, or Firm* — Dentons US LLP

(57) ABSTRACT

There is provided a self light emitting display device, including a variation detection unit configured to detect a variation of a video signal equal to, or greater than a predetermined threshold, a correction unit configured to correct an output level of the video signal based on the detection of the variation by the variation detection unit, and a video processing unit configured to perform a process with a predetermined time delay on the video signal supplied from the variation detection unit and configured to output the processed video signal to the correction unit.

7 Claims, 9 Drawing Sheets

| DETERMINATION OF THRESHOLD | Limit | CONTROL LINE 3 | CONTROL LINE 2 | CONTROL LINE 1 | CORRECTED GAIN |
|---|---|---|---|---|---|
| $0 \leq ACL(n) < TH0$ | — | L | L | L | 1 TIMES |
| $TH0 \leq ACL(n) < TH1$ | LIMIT_0 | L | L | H | 0.95 TIMES |
| $TH1 \leq ACL(n) < TH2$ | LIMIT_1 | L | H | L | 0.9 TIMES |
| $TH2 \leq ACL(n) < TH3$ | LIMIT_2 | L | H | H | 0.85 TIMES |
| $TH3 \leq ACL(n) < TH4$ | LIMIT_3 | H | L | L | 0.8 TIMES |
| $TH4 \leq ACL(n) < TH5$ | LIMIT_4 | H | L | H | 0.7 TIMES |
| $TH5 \leq ACL(n) < TH6$ | LIMIT_5 | H | H | L | 0.6 TIMES |
| $TH6 \leq ACL(n)$ | LIMIT_6 | H | H | H | 0.5 TIMES |

CONTROL OF VIDEO SIGNAL POWER VARIATIONS IN SELF LIGHT EMITTING DISPLAY DEVICE

CROSS REFERENCE TO RELATED APPLICATION

This application claims the benefit of Japanese Priority Patent Application JP 2012-279834 filed Dec. 21, 2012, the entire contents of which are incorporated herein by reference.

BACKGROUND

The present disclosure relates to a self light emitting display device, control method of the self light emitting display device and a computer program.

An organic Electro Luminescence (EL) display is a display which has an advantage that it makes thin display panel possible, because it is not only excellent in wide viewing angle characteristic, response speed, wide range of color representation, and high contrast performance, but also each pixels themselves emit light.

The self light emitting display device such as an Organic EL display has a characteristic that the amount of electric current flowing through the display panel varies in response to the input video signal, unlike the display device such as a liquid crystal display, where the backlight should keep constant luminance level. Therefore, the electric power consumption per unit time in the self light emitting display device is not constant, and it may vary extremely in response to display contents.

Therefore, a technology for electric power control of the self light emitting display device has been considered and disclosed. For example, in JP 2007-147868A, there was disclosed a peak luminance control device that adjusts the peak luminance of the light emitting panel surface in the self light emitting display device, frame by frame. JP 2007-147868A also discloses a technology for adjusting the peak luminance level by applying gain per frame by mounting a buffer memory for delaying the video signal for matching an output peak control signal and a phase of the video signal output from the organic EL panel.

SUMMARY

In recent years, high resolution and large-size of the display panel have become a trend in the field of the display device and it also applies to the self light emitting display device field. In order to display videos in such a display panel, the video signal amplitude per frame should be increased. Therefore, for applying a technology for delaying the video signal by mounting the buffer memory in the self light emitting display device with high resolution and large-sized light emitting panel, as described in JP 2007-147868A, high capacity memory becomes necessary, and that leads to cost uprising.

It is apparent that mounting the buffer memory and buffering the video signal have influences on the video signal delay. For example, when the delay of one frame takes place, 60 Hz video signal is delayed by $1/60=16$ ms. Thus, mere correction of gain control leads to one frame delay and increase of the overall video delay, and affects operability of the user.

In case where the memory for buffering the video signal is not mounted in order to avoid the video signal delay, electric power supply capacity does not increase too much thanks to low electric power consumption in a panel having low number of image pixel in the related art, and it does not give much impact on the size of electric power supply circuit board. However, if memory for buffering the video signal is not mounted to avoid the delay under the high density pixel trend in the future, the electric power consumption will increase. When electric power source capacity is increased for increasing the allowed electric power consumption, electric power source circuit board becomes large, and thus the advantage of self light emitting display device making thin display panel possible is impaired.

The present disclosure provides a new and improved self light emitting display device, control method, and computer program that are capable of controlling video signal level and reducing electric power consumption when displaying the video without having the memory for buffering the video signal for gain control.

According to the present disclosure, there is provided a self light emitting display device, including a variation detection unit configured to detect a variation of a video signal equal to, or greater than a predetermined threshold, a correction unit configured to correct (i.e., adjust) an output level of the video signal based on the detection of the variation by the variation detection unit, and a video processing unit configured to perform a process with a predetermined time delay on the video signal supplied from the variation detection unit and configured to output the processed video signal to the correction unit.

Further, according to the present disclosure, there is provided a control method of a self light emitting display device, the method including detecting the variation of a video signal equal to or greater than a predetermined threshold, performing a process with predetermined time delay on the video signal and outputting the processed video signal, and correcting the output level of the video signal which has been delayed for the predetermined time in the video processing step based on the detection of the variation performed in the variation detection step.

Further, according to the present disclosure, there is provided a computer program for causing a computer to execute: detecting a variation of a video signal equal to or greater than a predetermined threshold, performing a process with predetermined time delay on the video signal and outputting the processed video signal, and correcting an output level of the video signal which has been delayed for the predetermined time in the video processing step based on the detection of the variation performed in the variation detection step.

As described above, according to the present disclosure, it is possible to provide the new and improved self light emitting display device, control method of the self light emitting display device, and computer program, that can reduce electric power consumption when displaying videos by controlling the level of the video signal, without having a memory for buffering the video signal for gain controlling.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
1. An exemplary embodiment of the present disclosure
1-1. Configuration example of the self light emitting display device
1-2. Configuration example of the display control unit
1-3. Operation example of the self light emitting display device
2. Summary

Figure 1:
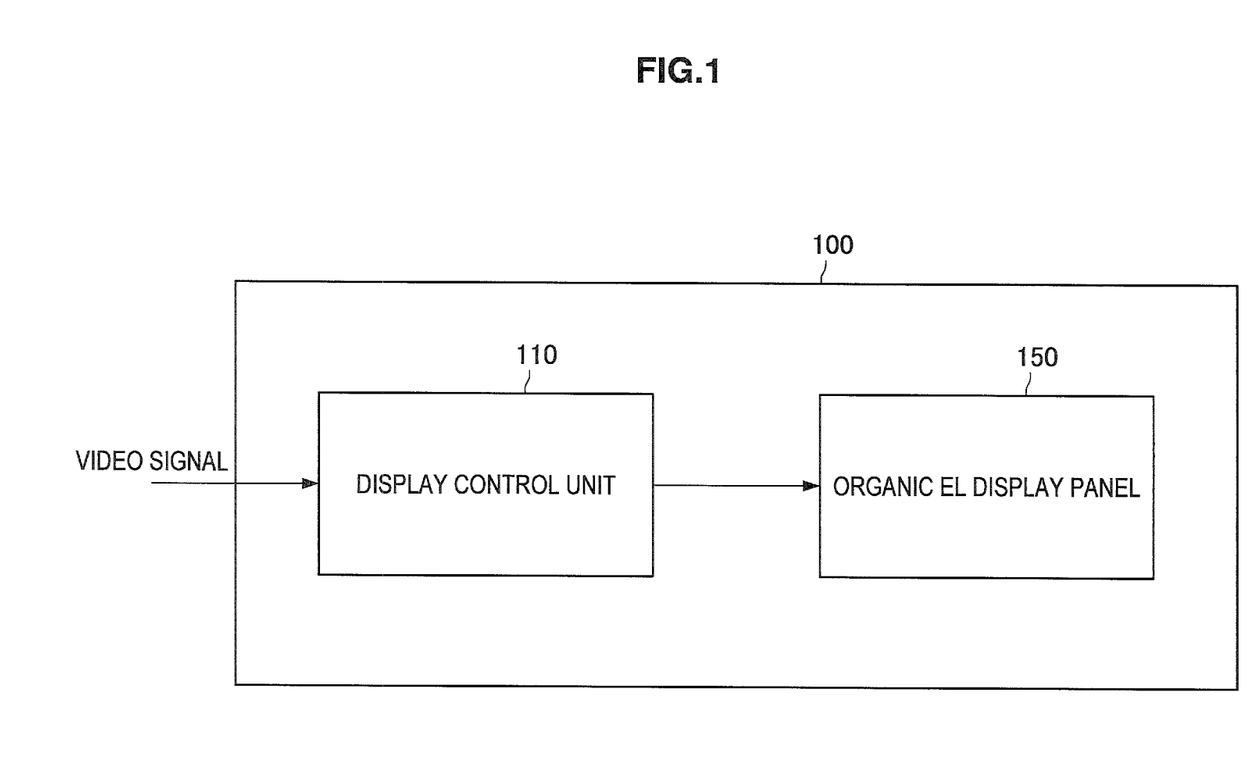
FIG. 1 is an explanatory diagram illustrating a configuration example of the self light emitting display device 100 according to an exemplary embodiment of the present disclosure.

1. AN EXEMPLARY EMBODIMENT OF THE PRESENT DISCLOSURE 1-1. Configuration Example of a Self Light Emitting Display Device At first, there will be explained the configuration example of the self light emitting display device according to an exemplary embodiment of the present disclosure in reference to drawings. FIG. 1 is an explanatory diagram illustrating a configuration example of the self light emitting display device 100 according to an exemplary embodiment of the present disclosure. The following describes a configuration example of the self light emitting display device 100 according to an exemplary embodiment of the present disclosure in reference to FIG. 1.

The self light emitting display device 100 illustrated in FIG. 1 is a device for displaying video, where the image pixel itself emits light in response to current corresponding to the video signal. As shown in FIG. 1, the self light emitting display device 100 according to an exemplary embodiment of the present disclosure is configured to include a display control unit 110 and an organic EL display panel 150.

The display control unit 110 performs signal processing on the video signal provided for the self light emitting display device 100, for displaying the video on the organic EL display panel 150, and provides the video signal after signal processing for the organic EL display panel 150. There are various signal processing performed by the display control unit 110, such as a luminance control processing, a frame interpolation processing, an up-scaling processing, and so on.

The display control unit 110 included in the self light emitting display device 100 according to an exemplary embodiment of the present disclosure calculates an electric current value frame by frame when displaying videos on the organic EL display panel 150. The display control unit 110 detects the variation of the electric current value of each frame, and performs luminance control process on the video signal.

The organic EL display panel 150 is a self light emitting display panel including the organic EL elements in each image pixel arranged in matrix at intersections of the plurality of scan lines and data lines, the self light emitting display panel displaying videos by making the organic EL elements mounted on each image pixels emit light in luminance responding to the electric current value. The organic EL display panel 150 can display videos based on the video signal by making the organic EL elements arranged in each image pixel emit light according to electric current flowing based on the video signal processed through the display control unit 110.

Although not shown in FIG. 1, the organic EL display panel 150 is composed of scanning lines for selecting the image pixel with predetermined scanning cycle, data lines for providing the luminance information to drive the image pixel, and pixel circuits for controlling the electric current amount based on the luminance information and making the organic EL elements which are light emitting devices emit light in response to the electric current amount, all of them being arranged in matrix; the configuration of the scanning lines, the data lines, and the image pixel circuit making it possible for the self light emitting display device 100 to display the videos in response to the video signal.

Also, the structure of each image pixel in the organic EL display panel 150 is not limited to a specific one and any structure can be employed. Further, the organic EL display panel may be a display for displaying the video by three colors of red (R), green (G), B (blue), or may be a display for displaying the video by using other color (for example, it may be white color) in addition to the three primary colors of RGB.

As described above, since the organic EL display panel 150 displays the video by making the organic EL elements emit light in luminance responding to the electric current value, electric current that flows in the organic EL display panel 150 is increased spontaneously when it attempts to display a high luminance level video. When the current that flows in the organic EL display panel 150 is increased, as a result, the total amount of the electric power consumption of the self light emitting display device 100 is increased, as a whole.

If electric power source capacity that is allowed in the self light emitting display device 100 is increased for increasing the allowed electric power consumption in the self light emitting display device 100, electric power source circuit board becomes large, therefore the advantage of self light emitting display device making thin display panel possible is impaired. On the other hand, if electric power supply capacity is decreased in order to avoid losing the advantage of such self light emitting display device, more power than allowed is consumed when a high luminance video is displayed, and this may lead to destruction of the power supply circuit board of the self light emitting display device 100.

Therefore, the self light emitting display device 100 in accordance with an exemplary embodiment of the present disclosure controls gain applied to the provided video signal in order to prevent electric power of the self light emitting display device 100 from being consumed more than predetermined electric power in advance. The self light emitting display device 100 in accordance with an exemplary embodiment of the present disclosure can set a limit so that electric power is prevented from being consumed more than allowed value in the organic EL display panel 150 by controlling gain applied to video signal.

Further, in the gain control as described above, the self light emitting display device 100 according to an exemplary embodiment of the present disclosure can control the gain applied to the video signal without using memory buffering the video signal, and without delaying the video signal for gain control.

There was an exemplary configuration of the self light emitting display device 100 according to an exemplary embodiment of the present disclosure in reference to FIG. 1. Next, a configuration example of the display control device 110 that relates to an exemplary embodiment of the present disclosure will be described.

1-2. Configuration Example of the Display Control Unit

Figure 2:
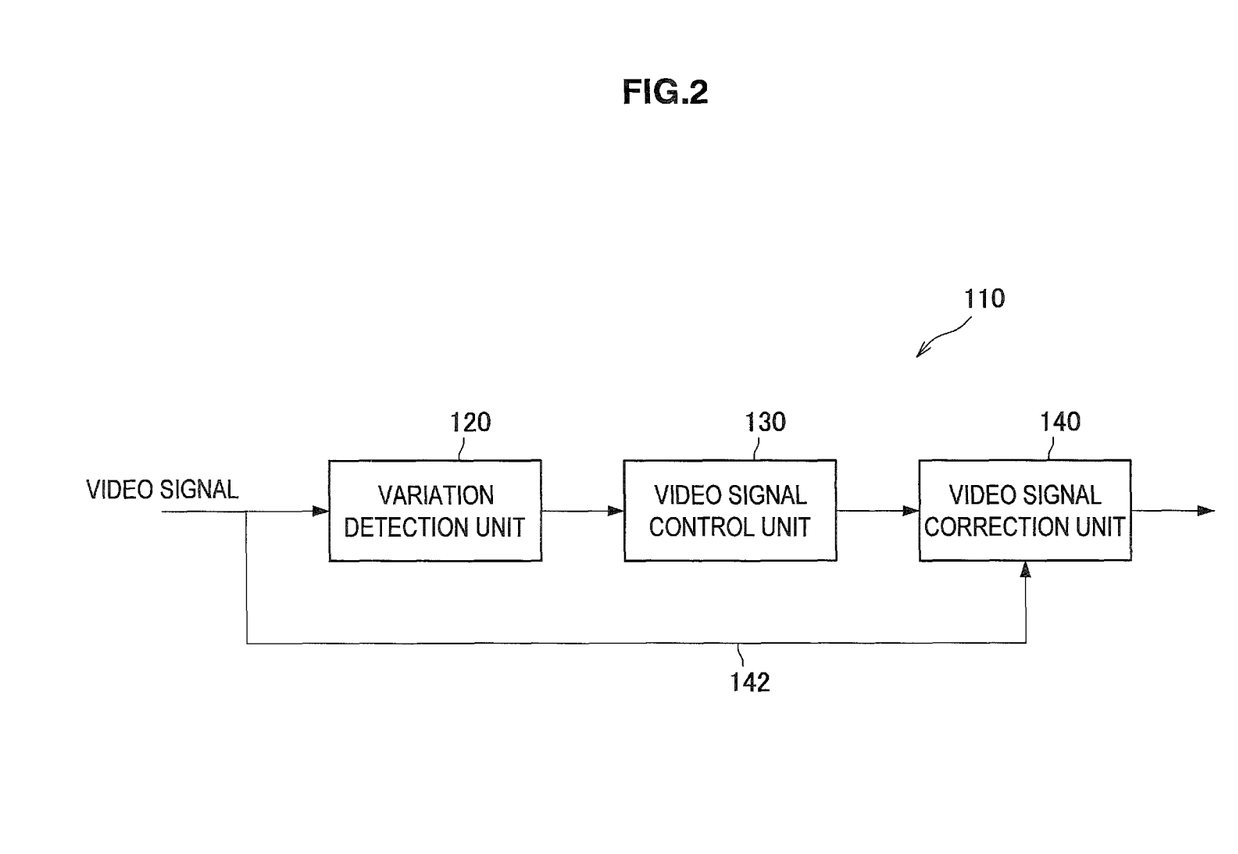
FIG. 2 is an explanatory diagram illustrating a configuration example of the display control unit 110 according to an exemplary embodiment of the present disclosure.

FIG. 2 is an explanatory diagram illustrating a configuration example of a display control unit 110 according to an exemplary embodiment of the present disclosure. In FIG. 2, there is illustrated a configuration for performing luminance control process to prevent power consumption in the organic EL display panel 150 from exceeding over allowed value. The following describes a configuration example of the display control unit 110 according to an exemplary embodiment of the present disclosure in reference to FIG. 2.

As shown in FIG. 2, the display control unit 110 according to an exemplary embodiment of the present disclosure is configured to include a variation detection unit 120, a video signal control unit 130, and a video signal correction unit 140.

The variation detection unit 120 detects the presence or absence of extreme variation in the video signal supplied to the display control unit 110. The extreme variation of the video signal level means that in consecutive frames, the electric power consumed in the organic EL display panel 150 varies extremely. For example, the following case may correspond to the extreme variance of video signal: the video signal varies from black raster signal that consumes the lowest electric power to white raster signal that consumes the most electric power.

When the video signal level supplied to the display control unit 110 varies extremely and a video without any processing is displayed on the organic EL panel 150, the variation detection unit 120 detects that the organic EL panel 150 consumes the electric power exceeding the allowed electric power and the variation detection unit 120 notifies the video signal correction unit 140 via the control line 142 of the extreme variation. Also, the variation detection unit 120 outputs the video signal supplied to the display control unit 110 to the video signal control unit 130 irrespective of whether the extreme variation in the video signal level occurs.

The video signal control unit 130 performs video processing with predetermined delay, such as frame interpolation and up-scaling processing on video signal supplied from the variation detection unit 120. It is desirable that the video processing performed by the video signal control unit 130 is a process to be performed for enhancing video quality when the organic EL display panel 150 displays videos.

For example, the frame interpolation process is a video processing for displaying the video smoothly. The up-scaling process is the video processing for generating video signal appropriate in being displayed on a panel having large number of image pixels out of the video signal provided by the variable detection unit 120 when panel having large number of image pixels is used as the organic display panel 150.

Generally, these processes for enhancing video quality buffers video signal temporarily, and these processes lead to predetermined delay. The self light emitting display device 100 according to the present exemplary embodiment can control the video signal level on proper frame and reduce the power consumption in displaying the video by using the predetermined delay occurring in the video signal control unit 130, although the self light emitting display device 100 does not have memory for buffering the video signal for gain control.

The video signal control unit 130 supplies the video processed video signal to the video signal correction unit 140. For example, when the frame interpolation process is performed in the video signal control unit 130, predetermined delay occurs due to generating the interpolated video.

When the variation detection unit 120 detects, on video signal provided by the video signal control unit 130, extreme variation in the video signal level that exceeds the allowed electric power, the video signal correction unit 140 applies proper gain to a target frame and performs a process to reduce the video signal level.

The light emitting device 100 according to an embodiment of the present disclosure performs gain control on an appropriate frame not by delaying video signal for gain control on the video signal, but by utilizing delay occurring in other video processing, namely, video processing performed in the video signal control unit 130. By the process mentioned above, the self light emitting display device 100 according to an embodiment of the present disclosure can control video signal level and reduce the electric power consumption when displaying videos, without having the memory for buffering the video signal.

The control line 142 is a line for notifying the extreme variation of the video signal level detected by the variation detecting unit 120 to the video signal correction unit 140. For example, it may be a line corresponding to general purpose input/output (GPIO) interface or it may be a line corresponding to serial communication. Further, the number of the control lines 142 may be one or more than two, but if the number of the control lines 142 are two or more, it becomes possible to set the gain in detail, the gain being applied to the video signal by the video signal correction unit 140 applies. It will be described in detail later.

An exemplary configuration of the display control unit 110 according to an exemplary embodiment of the present disclosure was described in reference to FIG. 2, as above.

[Operation Example of the Self Light Emitting Display Device]

Next, an operation example of the self light emitting display device 100 according to an exemplary embodiment of the present disclosure will be described. Before the description of the self light emitting display, gain control when a video signal is not delayed will be described. That is, the gain control when the video signal control unit 130 is not provided in the configuration of the display control unit 110 shown in FIG. 2 and a video signal is supplied from the variation detection unit 120 to the video signal correction unit 140 without the delay will be described.

Figure 3:
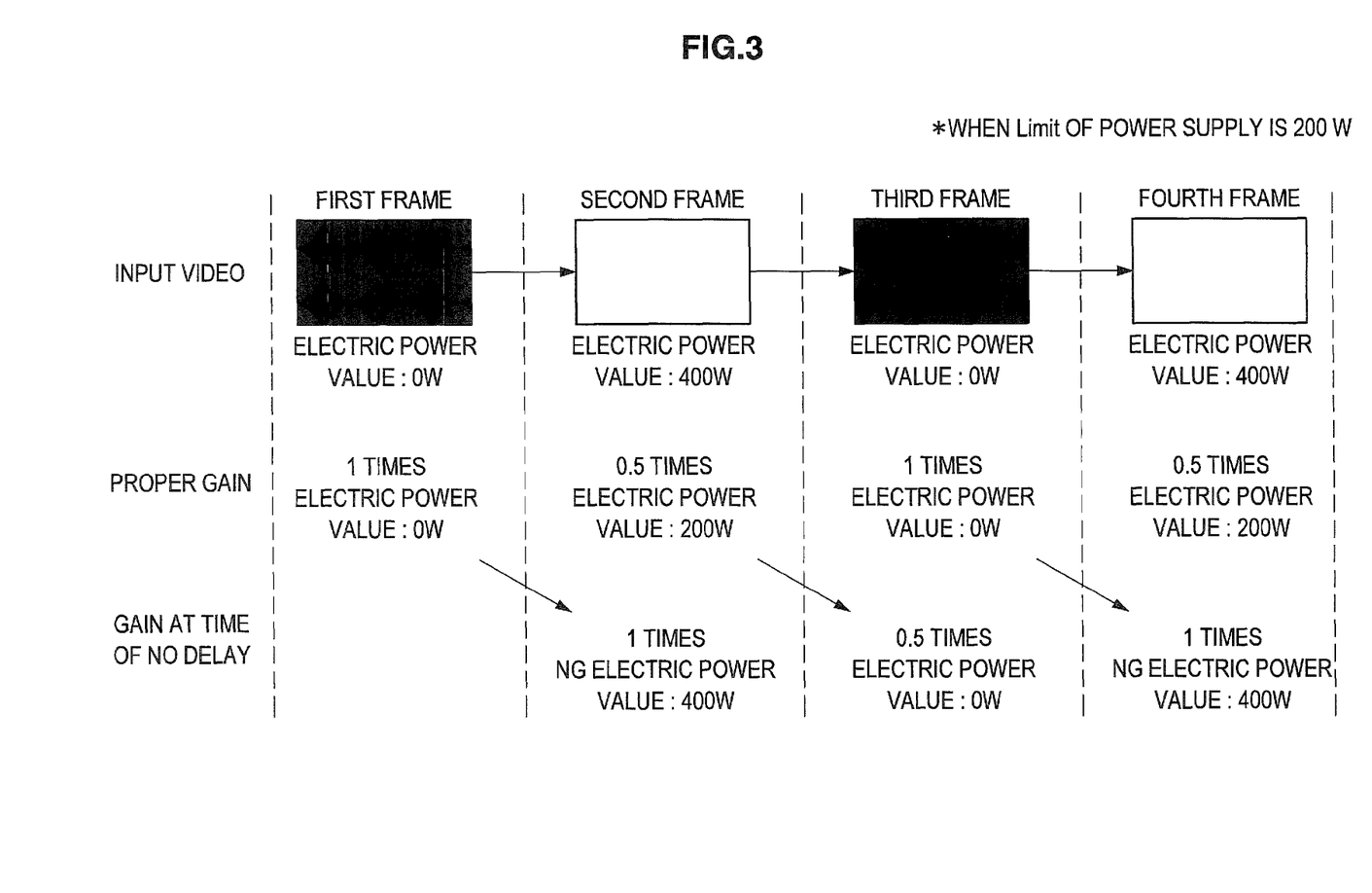
FIG. 3 is an explanatory diagram illustrating an example of gain control when the video signal is not delayed.

FIG. 3 is an explanatory diagram illustrating an example of the gain control when the video signal is not delayed. In FIG. 3, an input video is shown from a first frame to a fourth frame. FIG. 3 shows a case in which a limit of 200 W can be imposed on a power supply and electric power of 400 W is consumed by the organic EL display panel 150 when the entire white video is displayed.

As shown in FIG. 3, a case in which black and white raster signals are alternately supplied will be considered. Since the black raster signal is supplied in the first frame, the electric power consumed by the organic EL display panel 150 is 0 W. Accordingly, in the first frame, 1 times the gain of the video signal is a proper gain. Since the white raster signal is supplied in the continued second frame, the electric power consumed by the organic EL display panel 150 is 400 W. Accordingly, an extreme variation in the video signal level is detected in the second frame by the variation detection unit 120, and thus 0.5 times the gain of the video signal is a proper gain in the second frame.

However, even when the variation detection unit 120 detects the extreme variation in the video signal level, the video signal correction unit 140 may not immediately apply the gain to a gain control target frame, but may apply the gain to a nearest subsequent frame.

Then, as shown in FIG. 3, the video signal correction unit 140 may apply 1 times the gain to the second frame and apply 0.5 times the gain to the third frame. Therefore, when the second frame is displayed, the electric power consumed by the organic EL display panel 150 may be 400 W. Since this consumed electric power exceeds the limit value (200 W), there is a concern that a power supply may be broken down. When the proper gain is not applied, a luminance difference between frames may increase and accordingly deteriorate video quality.

Accordingly, to apply a proper gain to a target frame at the time of control of the gain and not to cause excessive delay, in the present embodiment, the video signal control unit 130 that performs video processing with predetermined delay is provided in the variation detection unit 120 and the video signal correction unit 140.

The gain control when the video signal is not delayed has been described. Next, an operation example of the self light emitting display device 100 according to an exemplary embodiment of the present disclosure will be described.

Figure 4:
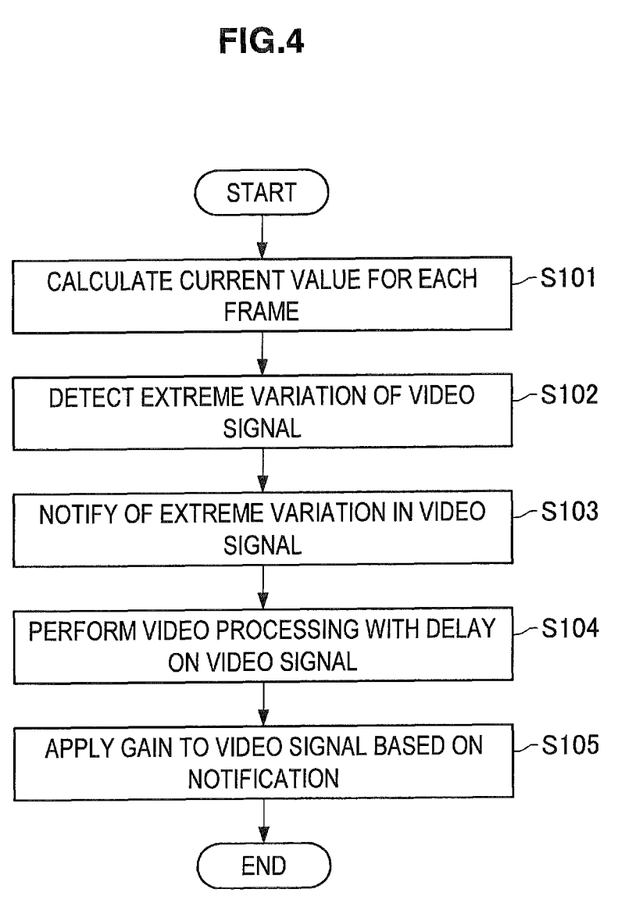
FIG. 4 is a flow chart illustrating an operation example of the self light emitting display device 100 according to an exemplary embodiment of the present disclosure.

FIG. 4 is a flow chart illustrating an operation example of the self light emitting display device 100 according to an exemplary embodiment of the present disclosure. The flowchart illustrated in FIG. 4 shows an operation example of the self light emitting display device 100 when an extreme variation in a video signal level is detected and the gain is controlled such that the gain does not exceed the limit value of the power supply. Hereinafter, an operation example of the self light emitting display device 100 according to an exemplary embodiment of the present disclosure will be described with reference to FIG. 4.

At first, the self light emitting display device 100 calculates a current value flowing in the organic EL display panel 150 for each frame (step S101). The calculation of the current value is performed by the variation detection unit 120. The current value for each frame is referred to as an average current level (ACL) in the following description.

When the current value is calculated for each frame, the self light emitting display device 100 subsequently determines the presence or absence of extreme variation in the level which exceeds the limit value of the power supply for the video signal by comparing the current values with the current value of the previous frame (step S102). The detection of the presence or absence of the extreme variation in the level which causes the excess of the limit value of the power supply is performed by the variation detection unit 120.

When the variation in the extreme level which exceeds the limit value of the power supply for the video signal is detected by the variation detection unit 120, the variation detection unit 120 notifies the video signal correction unit 140 via the control line 142 of the extreme variation level (step S103). Then, the video signal control unit 130 performs the video processing with predetermined delay on a signal output by the variation detection unit 120 and delays the video signal by a predetermined amount (step S104).

Figure 5:
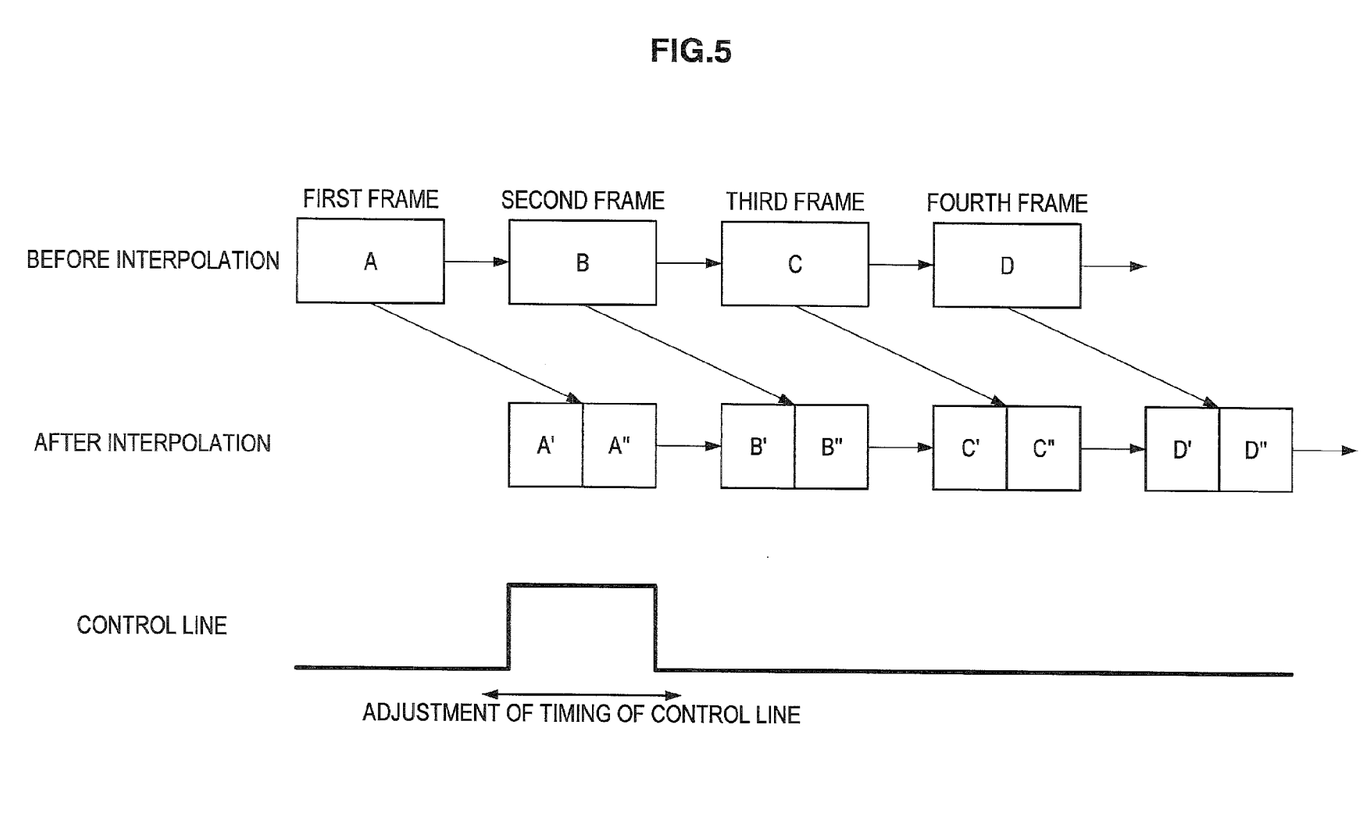
FIG. 5 is an explanatory diagram illustrating an example of the frame interpolation processing by performing the video processing with a predetermined delay.

FIG. 5 is an explanatory diagram illustrating an example of the frame interpolation processing in which the video processing is performed with a predetermined delay. As shown in FIG. 5, when video signals are input in the order of A→B→C→D, videos A' and A" are generated through frame interpolation process from a video A of the first frame and a video B of the second frame. For example, delay corresponding to one frame occurs due to the frame interpolation process.

The variation detection unit 120 included in the self light emitting display device 100 according to the present embodiment can match the video signal with a phase of an output of the control line 142 by adjusting a notification timing to the video signal correction unit 140 according to the delay.

Since a frequency or a kind of cadence of an input video signal is fixed in an apparatus such as a television, a delay amount in the video processing with the delay, such as the frame interpolation process is also determined in advance. Accordingly, by classifying and setting notification timings from the variation detection unit 120 to the control line 142 in advance based on information or the like regarding the frequency or cadence of video signals, the video signal can be matched with the phase of an output of the control line 142, for example, even at the timing at which the frequency of the video signal is switched from 24 Hz to 60 Hz.

Then, the video signal correction unit 140 notified of the extreme variation in the level via the control line 142 applies the gain which does not exceed the limit value of the power supply to the video signal of a target frame (step S105). For example, when the video signal correction unit 140 applies and outputs ⅓ times the gain to the video signal of a target frame on the assumption that the limit value of the power supply is 200 W and the consumed electric power at the time of display of a video with the highest luminance is 600 W, the electric power consumption in excess of the limit value does not occur for any video signal at the time of the display of a video.

The operation example of the self light emitting display device 100 according to the exemplary embodiment of the present disclosure has been described with reference to FIG. 4.

When the self light emitting display device 100 according to an exemplary embodiment of the present disclosure provides a plurality of detection ranges for the ACL and controls the plurality of control lines 142 for each detection range, gains to be applied can be set minutely.

For example, when the number of control lines 142 is one, gains to be applied can only be set roughly. However, when the number of control lines 142 is n (where n is an integer equal to or greater than 2), gains to be applied can be set by $2^n-1$ methods.

Figure 6:
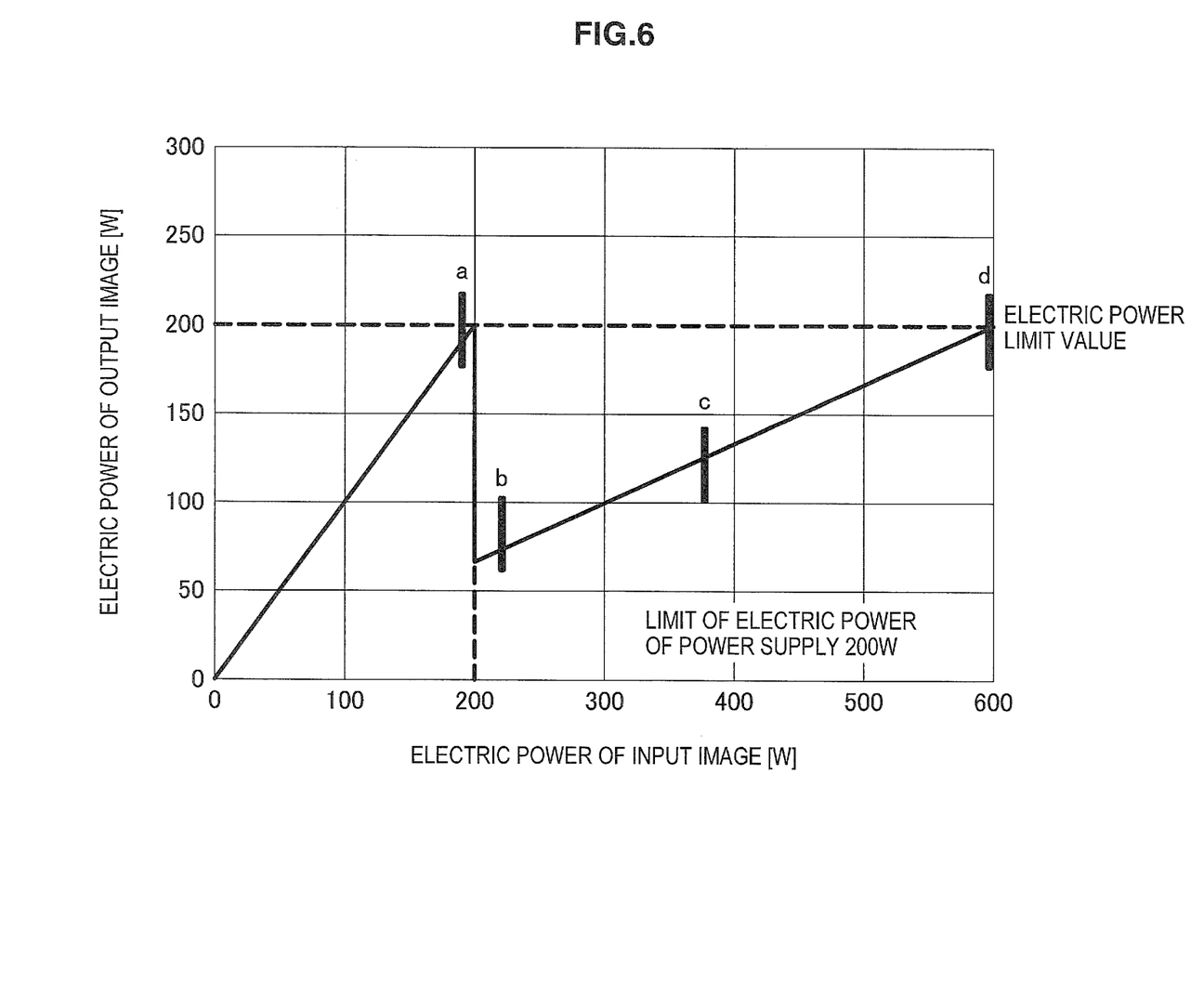
FIG. 6 is an explanatory diagram illustrating an application example of the gain when the number of control line 142 is one.
Figure 7:
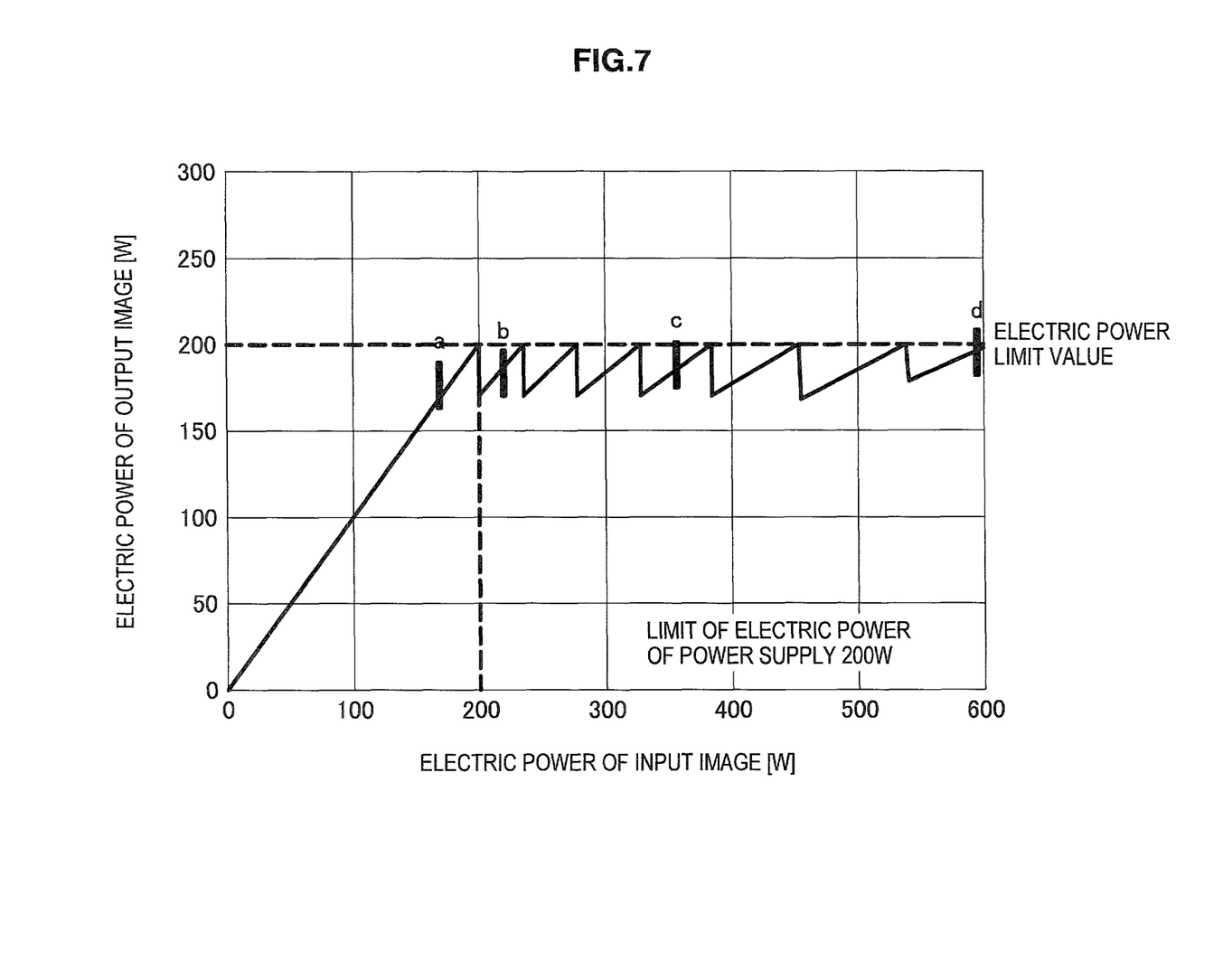
FIG. 7 is an explanatory diagram illustrating an application example of the gain applied when the number of control lines 142 are three.

FIG. 6 is an explanatory diagram illustrating a graph of an application example of the gain when the number of control lines 142 is one. FIG. 7 is an explanatory diagram illustrating a graph of an application example of the gain applied when the number of control lines 142 is three. In both cases illustrated in FIGS. 6 and 7, the limit value of the power supply is assumed to be 200 W and the consumed electric power at the time of display of a video with the highest luminance is assumed to be 600 W.

In the graphs shown in FIGS. 6 and 7, the horizontal axis represents consumed electric power (electric power of an input image) when an image is displayed based on an input video signal and the vertical axis represents consumed electric power (electric power of an output image) when an image is displayed based on a video signal after gain application.

When the electric power of an input image is changed from a point a to a point d in FIG. 6, the variation detection unit 120 detects extreme variation in the level of a video signal and notifies the video signal correction unit 140 of the extreme variation in the level of the video signal. At this time, based on whether the state of the control line 142 is high or low, the video signal correction unit 140 can know whether the variation detection unit 120 detects the variation. The video signal correction unit 140 is notified by the variation detection unit 120 and can allow the gain not to exceed the limit value of the power supply by applying ⅓ times the gain to the video signal.

Here, when the number of control lines 142 is one, ⅓ times the gain is normally applied to the video signal at the time of occurrence of any variation in the video signal correction unit 140. Accordingly, when the electric power of the input image is changed from the point a to the point b, only ⅓ times the gain can be applied in spite of the fact that the gain does not exceed the limit value of the power supply even at the time of the non-application of ⅓ times the gain. Therefore, when the gain slightly exceeds the limit value of the power supply, extreme variation in luminance occurs. Since the extreme variation in the luminance results in deterioration of video quality, the extreme variation in the luminance is preferably not caused while the gain does not exceed the limit value of the power supply.

Accordingly, when the number of control lines 142 is two or more and the video signal correction unit 140 changes the gain to be applied according to the state (the high or low state) of the control lines 142, the extreme variation in the luminance can be prevented.

That is, when the electric power of an input image is changed from a point a to a point b, c, or d in FIG. 7, the state (the high or low state) of the control lines 142 when the variation detection unit 120 notifies the video signal correction unit 140 of the variation is caused to differ. When the video signal correction unit 140 changes the gain to be applied according to the states of the control lines 142, the electric powers of the output images in the respective cases are substantially the same, and thus the extreme variation in the luminance can be prevented.

Figure 8:
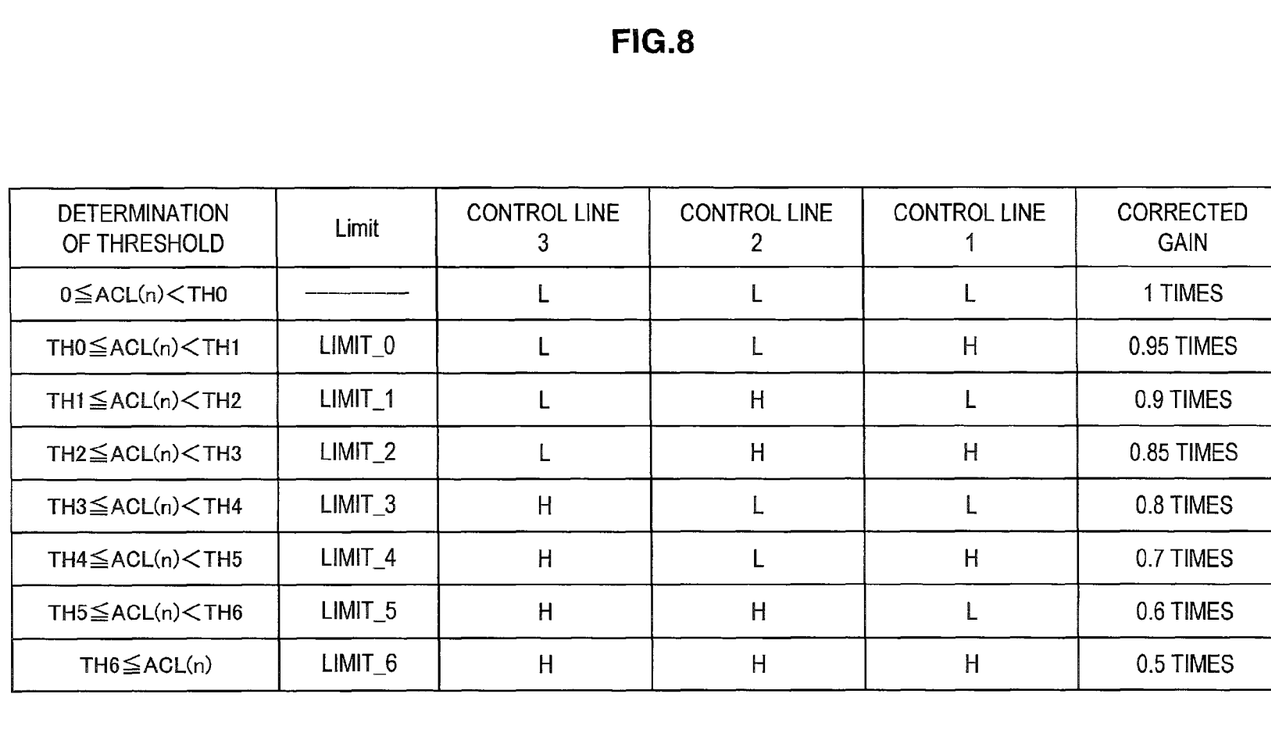
FIG. 8 is an explanatory diagram illustrating a table showing a relation of the gain and threshold.

FIG. 8 is an explanatory diagram illustrating a table showing a relation of the gain and the threshold value when the number of control lines 142 is three. When the number of control lines 142 is three, the video signal correction unit 140 can apply the gain of seven stages to the video signal according to the state (the high or low state) of the control lines 142, excluding a case in which 1 times the gain is set.

For example, when a value ACL(n) of the ACL at a time n is less than a threshold value TH0, as illustrated in FIG. 8, the variation detection unit 120 sets the states of all of the three control lines to be low (L). When the states of all of the three control lines are the low state, the video signal correction unit 140 sets the gain to be applied to the video signal to 1 times.

For example, when the ACL(n) is equal to or greater than the threshold value TH0 and is less than a threshold value TH1, the variation detection unit 120 sets the state of the first control line (control line 1) among the three control lines to be high (H) and sets the states of the remaining control lines to be low (L). When the state of the first control line (control line 1) is the high state and the states of the remaining control lines are the low state, the video signal correction unit 140 sets the gain to be applied to the video signal to 0.95 times.

In the example shown in FIG. 8, since the gain to be applied by the video signal correction unit 140 is changed according to the high and low states of the three control lines, eight values can be used as the gain to be applied by the video signal correction unit 140.

The threshold values and the values of the gain in the table shown in FIG. 8 are merely examples. Of course, the threshold values and the values of the gain when the number of control lines 142 is plural are not limited to the relevant examples.

Figure 9:
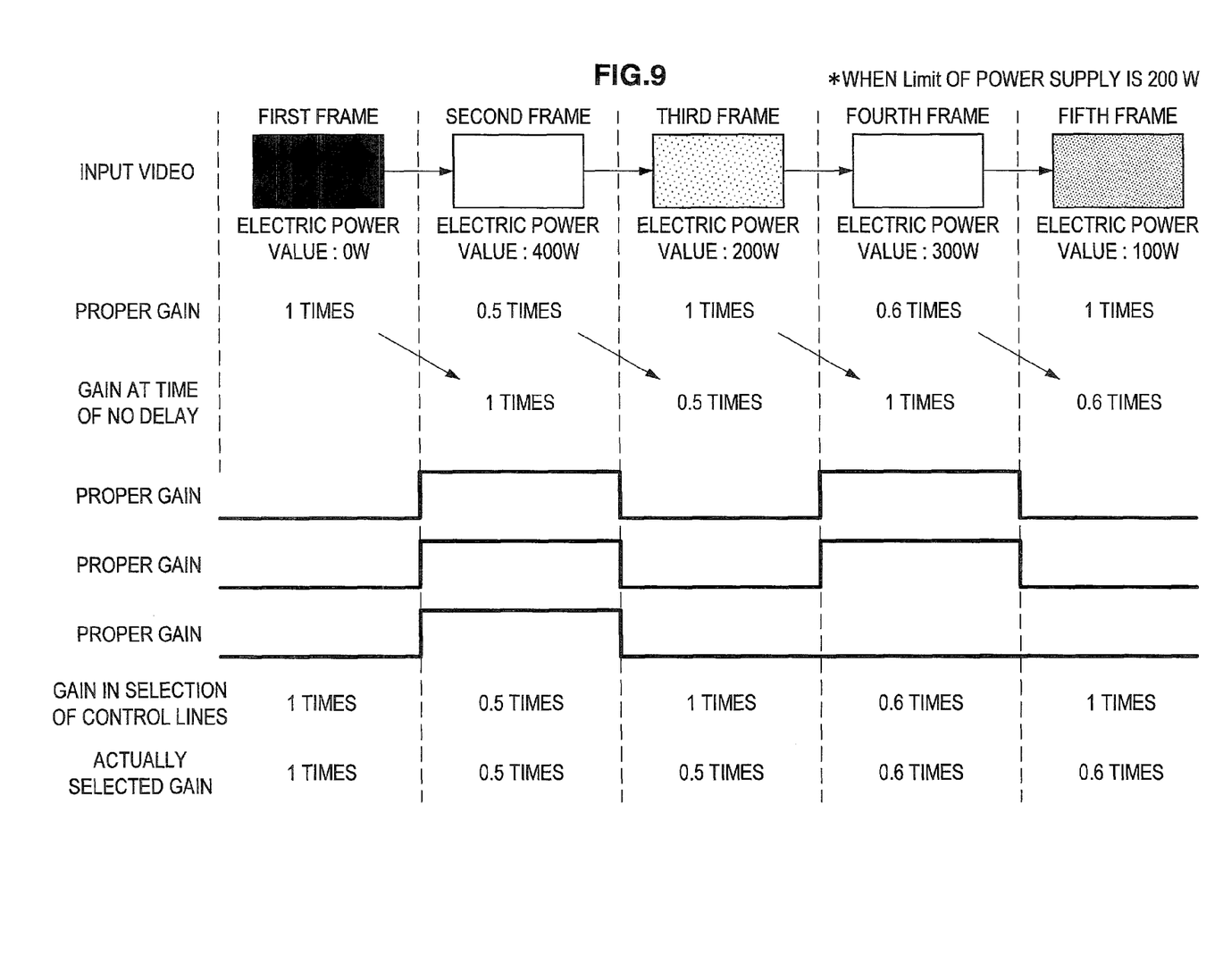
FIG. 9 is an explanatory diagram illustrating an example of the gain control according the video signal when the numbers of control lines 142 are three.

FIG. 9 is an explanatory diagram illustrating an example of the gain control according the video signal when the number of control lines 142 is three. FIG. 9 shows a case in which the electric power of 400 W is consumed by the organic EL display panel 150 when the electric power is limited to 200 W and a whole white video is displayed.

Since a black raster signal is supplied in the first frame, the electric power consumed by the organic EL display panel 150 is 0 W. Accordingly, in the first frame, 1 times the gain of the video signal is a proper gain. Since the variation detection unit 120 detects no variation in the first frame, the states of the control lines 142 are all low. The video signal correction unit 140 selects 1 times the gain in the first frame.

Since a white raster signal is supplied in the continued second frame, the electric power consumed by the organic EL display panel 150 is 400 W. Accordingly, an extreme variation in the video signal level which exceeds the limit value is detected in the second frame by the variation detection unit 120, and thus 0.5 times the gain of the video signal is a proper gain in the second frame. Since the variation detection unit 120 detects the variation in the second frame and the variation is the largest, the variation detection unit 120 sets the states of all of the control lines 142 to be high. The video signal correction unit 140 selects 0.5 times the gain in the second frame from the states of the control lines 142.

Since a raster signal with luminance lower than that of the second frame is supplied in the subsequent third frame, the electric power consumed by the organic EL display panel 150 is assumed to be 200 W as the calculation result of the current value. Accordingly, the fact that there is no extreme variation in the video signal level which exceeds the limit value is detected in the third frame by the variation detection unit 120, and thus 1 times the gain of the video signal is a proper gain in the third frame. Since the variation detection unit 120 detects no variation in the third frame, the states of the control lines 142 are all low.

However, to protect the power supply more safely, the video signal correction unit 140 compares the proper gain with the gain selected in the previous frame (the second frame) in the third frame and selects the smaller gain. In this example, since the gain selected in the second frame is smaller, the video signal correction unit 140 selects 0.5 times the gain in the third frame as well.

Since a raster signal used to display a color with luminance higher than that of the third frame is supplied in the subsequent fourth frame, the electric power consumed by the organic EL display panel 150 is assumed to be 300 W as the calculation result of the current value. Accordingly, an extreme variation in the video signal level which exceeds the limit value of the power supply is detected in the fourth frame by the variation detection unit 120, and thus 0.6 times the gain of the video signal is a proper gain in the fourth frame. Since 0.6 times the gain is caused to be selected by the video signal correction unit 140 in the fourth frame, the variation detection unit 120 sets the first and second control lines among the three control lines 142 to be high and sets the third control line to be low. The video signal correction unit 140 selects 0.6 times the gain in the fourth frame from the states of the control lines 142.

Since a raster signal with luminance lower than that of the fourth frame is supplied in the continued fifth frame, the electric power consumed by the organic EL display panel 150 is 100 W as the calculation result of the current value. Accordingly, the fact that there is no extreme variation in the video signal level which exceeds the limit value is detected in the fifth frame by the variation detection unit 120, and thus 1 times the gain of the video signal is a proper gain in the fifth frame. Since the variation detection unit 120 detects no variation in the fifth frame, the states of the control lines 142 are all low.

However, to protect the power supply more safely, the video signal correction unit 140 compares the proper gain with the gain selected in the previous frame (the fourth frame) in the fifth frame and selects the smaller gain. In this example, since the gain selected in the fourth frame is smaller, the video signal correction unit 140 selects 0.6 times the gain in the fifth frame as well.

Thus, by setting the number of control lines 142 to be plural, the gain can be minutely set. Therefore, since the extreme variation in luminance at the time of display of a video on the organic EL display panel 150 can be suppressed, the video quality can be prevented from deteriorating.

2. SUMMARY

As described above, the exemplary embodiment of the present disclosure provides the self light emitting display device that detects variation in a video signal level which exceeds a limit value of a power supply and applies a gain to a video signal according to the variation.

In the self light emitting display device according to the exemplary embodiment of the present disclosure, a gain can be applied to a suitable frame by using predetermined delay through the signal processing on a video signal which is different from the gain control at the time of the control of the gain on the video signal and the signal processing with the delay. By using the predetermined delay through the signal processing on a video signal which is different from the gain control and the signal processing with the delay, the self light emitting display device according to the exemplary embodiment of the present disclosure can realize electric power saving while suppressing the delay of a video.

The respective steps in the process performed by each device of this specification may not necessarily be processed chronologically in the order described in the sequence diagram or the flowchart. For example, the respective steps in the process performed by each device may be processed in an order different from the order described in the flowchart or may be processed in parallel.

A computer program causing hardware such as a CPU, a ROM, and a RAM included in each device to realize the same functions as those of the configuration of each device described above can be created. A storage medium storing the computer program can also be provided. By configuring each functional block illustrated in the functional block diagram by hardware, a series of processes can be realized by the hardware.

The preferred embodiments of the present disclosure have been described in detail with reference to the appended drawings, but embodiments of the present disclosure are not limited to the embodiments. It should be understood by those skilled in the art that various modifications, combinations, sub-combinations and alterations may occur depending on design requirements and other factors insofar as they are within the scope of the appended claims or the equivalents thereof, and the modifications, the combinations, the sub-combinations, and the alterations are, of course, construed to pertain to the technical scope of the present disclosure.

Additionally, the present technology may also be configured as below.

(1) A self light emitting display device including:

a variation detection unit configured to detect a variation of a video signal equal to or greater than a predetermined threshold;

a correction unit configured to correct an output level of the video signal based on the detection of the variation by the variation detection unit; and a video processing unit configured to output the video signal to the correction unit by performing a process with a predetermined time delay on the video signal supplied from the variation detection unit.

(2) The self light emitting display device according to (1), wherein the variation detection unit detects the variation of the video signal by a plurality of the threshold value, and the correction unit corrects the output level of the video signal based on the detection of the variation per each of the threshold value.

(3) The self light emitting display device according to (1) or (2), wherein the video processing unit performs a video quality enhancement process on the video signal with a predetermined time delay.

(4) The self light emitting display device according to (3), wherein the video processing unit performs an interpolation process between frames of the video signal as the video quality enhancement process.

(5) The self light emitting display device according to any one of (1) to (4), wherein the correction unit corrects the output level of the video signal so that the output level becomes equal to or below an upper limit of electric power that can be provided when a video is displayed based on the video signal.

(6) A control method of a self light emitting display device including:

detecting a variation of a video signal equal to or greater than a predetermined threshold;

performing a process with predetermined time delay on the video signal and outputting the processed video signal; and correcting the output level of the video signal which has been delayed for the predetermined time in the video processing step based on the detection of the variation performed in the variation detection step.

(7) A computer program for causing a computer to execute:

detecting a variation of a video signal equal to or greater than a predetermined threshold;

performing a process with predetermined time delay on the video signal and outputting the processed video signal; and correcting an output level of the video signal which has been delayed for the predetermined time in the video processing step based on the detection of the variation performed in the variation detection step.

What is claimed is:

1. A self light emitting display device comprising:
   a variation detection unit configured to receive a video signal and detect a variance of a power level of the video signal from at least one predetermined threshold and to generate a detection result for each predetermined threshold for a portion of the video signal;
   a video processing unit configured to receive the video signal from the variation detection unit and output a processed video signal after performing a process with a predetermined time delay on the video signal received from the variation detection unit; and a correction unit configured to receive the processed video signal and adjust an output power level of the processed video signal based on the detection result or detection results, wherein the correction unit adjusts the output power level of that portion of the video signal for which the detection result is or detection results are generated.

2. The self light emitting display device according to claim 1, wherein:

the variation detection unit detects the variance of the video signal from a plurality of thresholds and generates a plurality of detection results; and the correction unit adjusts the power output level of the processed video signal based on the plurality of detection results.

3. The self light emitting display device according to claim 1, wherein the video processing unit performs a video quality enhancement process on the video signal with a predetermined time delay.

4. The self light emitting display device according to claim 3, wherein the video processing unit performs an interpolation process between frames of the video signal as the video quality enhancement process.

5. The self light emitting display device according to claim 1, wherein the correction unit adjusts the output level of the processed video signal so that the output level becomes equal to or below an upper limit of electric power that can be provided when an image is displayed based on the video signal.

6. A control method of a self light emitting display device comprising:

detecting a variance of a power level of a video signal from at least one predetermined threshold and generating a detection result for each predetermined threshold;

processing the video signal with predetermined time delay and outputting a processed video signal; and adjusting the power level of that portion of the processed video signal for which a detection result was or detection results were generated based on the detection result or detection results.

7. A non-transitory computer readable medium storing program instructions that when executed cause a processing system to:

detect a variance of a power level of a video signal from at least one predetermined threshold and generate a detection result for each predetermined threshold;

process the video signal with a predetermined time delay and output a processed video signal; and adjust the power level of that portion of the processed video signal for which a detection result was or detection results were generated based on the detection result or detection results.

* * * * *